(12) United States Patent
Atarashi et al.

(10) Patent No.: US 7,872,440 B2
(45) Date of Patent: Jan. 18, 2011

(54) CONTROLLER OF ELECTRIC MOTOR

(75) Inventors: Hirofumi Atarashi, Wako (JP); Shoei Abe, Wako (JP); Keiichi Yamamoto, Wako (JP); Shigeru Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 12/058,944

(22) Filed: Mar. 31, 2008

(65) Prior Publication Data
US 2008/0246429 A1  Oct. 9, 2008

(30) Foreign Application Priority Data
Apr. 4, 2007  (JP) ............................. 2007-098483

(51) Int. Cl.
*H02P 25/16* (2006.01)

(52) U.S. Cl. ................... 318/772; 318/727; 318/767; 318/798; 318/799

(58) Field of Classification Search ............... 318/772, 318/767, 727, 798, 799
See application file for complete search history.

(56) References Cited

U.S. PATENT DOCUMENTS

| | | | | |
|---|---|---|---|---|
| 5,216,339 | A * | 6/1993 | Skybyk | 318/400.42 |
| 5,414,339 | A | 5/1995 | Masaki et al. | |
| 5,877,607 | A * | 3/1999 | Masaki et al. | 318/807 |
| 6,158,553 | A | 12/2000 | Oshima et al. | |
| 6,437,529 | B1 * | 8/2002 | Brown | 318/400.26 |
| 6,445,105 | B1 * | 9/2002 | Kliman et al. | 310/268 |
| 7,514,833 | B2 * | 4/2009 | Hsu et al. | 310/156.34 |

FOREIGN PATENT DOCUMENTS

| | | |
|---|---|---|
| JP | 01-157256 A | 6/1989 |
| JP | 05-103497 A | 4/1993 |
| JP | 09-275699 A | 10/1997 |
| JP | 10-271784 A | 10/1998 |
| JP | 2001-136721 A | 5/2001 |
| JP | 2002-052592 A | 2/2002 |
| JP | 2002-369467 A | 12/2002 |
| JP | 2003-189690 A | 7/2003 |
| JP | 2006-129668 A | 5/2006 |

* cited by examiner

*Primary Examiner*—Walter Benson
*Assistant Examiner*—David S Luo
(74) *Attorney, Agent, or Firm*—Arent Fox LLP

(57) ABSTRACT

A controller of an electric motor for improving operation efficiency in performing electric conducting control of the electric motor of an axial air-gap type is provided. Therefore, the controller of the electric motor (3) of the axial air-gap type including a rotor (11) having a permanent magnet, a first stator (12a) and a second stator (12b) oppositely arranged through the rotor (11) in a rotation axis direction of the rotor (11), and armature windings (13a, 13b) mounted to the first stator (12a) and the second stator (12b) has an electric current command determining section (30) for switching between a both-side stator driving mode for conducting a driving electric current to both the armature winding (13a) of the first stator (12a) and the armature winding (13b) of the second stator (12b), and a one-side stator driving mode for conducting the driving electric current to only the armature winding (13a) of the first stator (12a) in accordance with a request value Tr_c of output torque of the electric motor (3).

12 Claims, 6 Drawing Sheets

CONTROLLER OF ELECTRIC MOTOR

FIELD OF THE INVENTION

The present invention relates to a controller of an electric motor of an axial air-gap type.

BACKGROUND ART

The electric motor of the axial air-gap type having a rotor having a permanent magnet, two stators arranged on both sides of the rotor in a rotation axis direction of the rotor, and an armature winding mounted to each stator is formerly known (e.g., see Japanese Patent Laid-Open No. 10-271784 and Japanese Patent Laid-Open No. 2001-136721). In accordance with such an electric motor of the axial air-gap type, relatively high output torque can be generated while the axial length of the rotor of the electric motor is shortened.

In electric conducting control of the electric motor of the axial air-gap type, an electric current is conducted to the armature windings of both the stators arranged on both the sides of the rotor by the technique described in the above publications. Thus, leakage of a magnetic flux due to the armature of the stator is reduced and output torque of the electric motor can be increased.

Further, it is desired to improve operation efficiency in performing the electric conducting control of the electric motor of the axial air-gap type.

SUMMARY OF THE INVENTION

The present invention is made in consideration of the above background, and resides in a controller of an electric motor of an axial air-gap type comprising a rotor having a permanent magnet, and a first stator and a second stator oppositely arranged through the rotor in a rotation axis direction of the rotor; wherein the controller comprises a driving mode switching means for switching between a both-side stator driving mode for supplying a driving electric current to both an armature winding of the first stator and an armature winding of the second stator, and a one-side stator driving mode for supplying the driving electric current to only the armature winding of the first stator, in accordance with a request value of output torque of the electric motor.

In accordance with such a present invention, the driving mode switching means switches between the both-side stator driving state and the one-side stator driving state in accordance with the request value of the output torque of the electric motor. Output characteristics of the electric motor can be changed in accordance with the request value of the output torque of the electric motor by switching between the both-side stator driving mode and the one-side stator driving mode in this way. Thus, operation efficiency of the electric motor can be improved.

Further, the driving mode switching means sets the both-side stator driving mode when the request value of the output torque of the electric motor is a predetermined value or more, and sets the one-side stator driving mode when the request value of the output torque of the electric motor is less than the predetermined value.

In accordance with such a present invention, when the request value of the output torque of the electric motor is the predetermined value or more and the output of high torque is requested in the electric motor, the driving mode switching means sets the both-side stator driving mode. Thus, magnetic fluxes generated by the armature windings of both the first stator and the second stator are strengthened, and the electric motor can be set to output characteristics corresponding to the high torque. On the other hand, when the request value of the output torque of the electric motor is less than the predetermined value and the output of low torque is requested in the electric motor, the driving mode switching means sets the one-side stator driving mode. Thus, the electric motor is set to output characteristics corresponding to the low torque, and copper loss caused by conducting an electric current to the armature winding of the second stator is avoided and the electric motor can be efficiently operated.

Further, a winding number of times of the armature winding of the first stator and a winding number of times of the armature winding of the second stator are set to the same.

In accordance with such a present invention, since the winding number of times of the armature winding of the first stator and the winding number of times of the armature winding of the second stator are set to the same, inductances and induced voltage constants of the armature winding of the first stator and the armature winding of the second stator become the same. Therefore, it is possible to combine and use the driving circuit of the armature winding of the first stator and the driving circuit of the armature winding of the second stator, and the construction of the driving circuit of the electric motor can be simplified.

Further, a wire diameter of a coil of the armature winding of the first stator is set to be larger than a wire diameter of a coil of the armature winding of the second stator.

In accordance with such a present invention, after the winding number of times of the armature winding of the first stator and the armature winding of the second stator are set to the same number, the wire diameter of the armature winding of the first stator is set to be larger than the wire diameter of the armature winding of the second stator. Thus, the second stator to which the driving electric current is supplied in only the both-side stator driving mode can be set to be smaller than the first stator. Thus, the electric motor can be made compact in size.

Further, the controller further comprises a change-over switch for switching connection between the armature winding of the second stator and a driving circuit of the armature winding of the second stator to a conducting state and an interrupting state, and the driving mode switching means sets the connection between the armature winding of the second stator and the driving circuit of the armature winding of the second stator to the interrupting state by the change-over switch in the one-side stator driving mode.

In accordance with such a present invention, the portion between the armature winding of the second stator receiving no supply of the driving electric current and the driving circuit of the armature winding of the second stator is set to the interrupting state by the change-over switch in the one-side stator driving mode. Thus, it is possible to avoid that an induced voltage is generated in the armature winding of the second stator by rotating the rotor. Therefore, it is possible to prevent load of the rotor from being increased by the induced voltage.

Further, the driving mode switching means sets both a first switching element for switching conduction and interruption on a high electric potential side of an input section of the armature winding of each phase and a second switching element for switching conduction and interruption on a low electric potential side of the input section of the armature winding of each phase to an off state in the one-side stator driving mode, wherein the first switching element and the second switching element constitute the driving circuit of the second stator and are arranged for each phase of the second stator.

In accordance with such a present invention, in the one-side stator driving mode, both the first switching element and the second switching element constituting the driving circuit of the second stator are set to the off state. Thus, the induced voltage caused in the armature winding of the second stator by rotating the rotor is reduced, and electric power loss in the armature of the second stator can be reduced.

Further, the controller comprises a rotational speed detecting means for detecting a rotational speed of the electric motor; the driving mode switching means sets both a first switching element for switching conduction and interruption on a high electric potential side of an input section of the armature winding of each phase and a second switching element for switching conduction and interruption on a low electric potential side of the input section of the armature winding of each phase to an off state in the one-side stator driving mode when the rotational speed of the electric motor is less than a predetermined rotational speed, wherein the first switching element and the second switching element constitute the driving circuit of the second stator and are arranged for each phase of the second stator; and when the rotational speed of the electric motor is the predetermined rotational speed or more in the one-side stator driving mode, each first switching element is set to the on state and each second switching element is set to the off state, or each first switching element is set to the off state and each second switching element is set to the on state.

In accordance with such a present invention, when the rotational speed of the electric motor becomes the predetermined value or more in the one-side stator driving mode, each first switching element is set to the on state and each second switching element is set to the off state, or each first switching element is set to the off state and each second switching element is set to the on state in the driving circuit of the armature winding of the second stator. Thus, electric power loss in the armature of the second stator can be reduced in comparison with a case in which both the first switching element and the second switching element are set to the off state.

Further, magnetic circuit cross sections of the first stator and the second stator are set to the same.

In accordance with such a present invention, in the both-side stator driving mode, matching property of magnetic resistance in the armature of the first stator and magnetic resistance in the armature of the second stator is raised, and magnetic fluxes caused by the armature of the first stator and the armature of the second stator can be further strengthened.

DESCRIPTION OF THE PREFERRED EMBODIMENTS

One embodiment of the present invention will be explained with reference to FIGS. 1 to 6.

Figure 1:
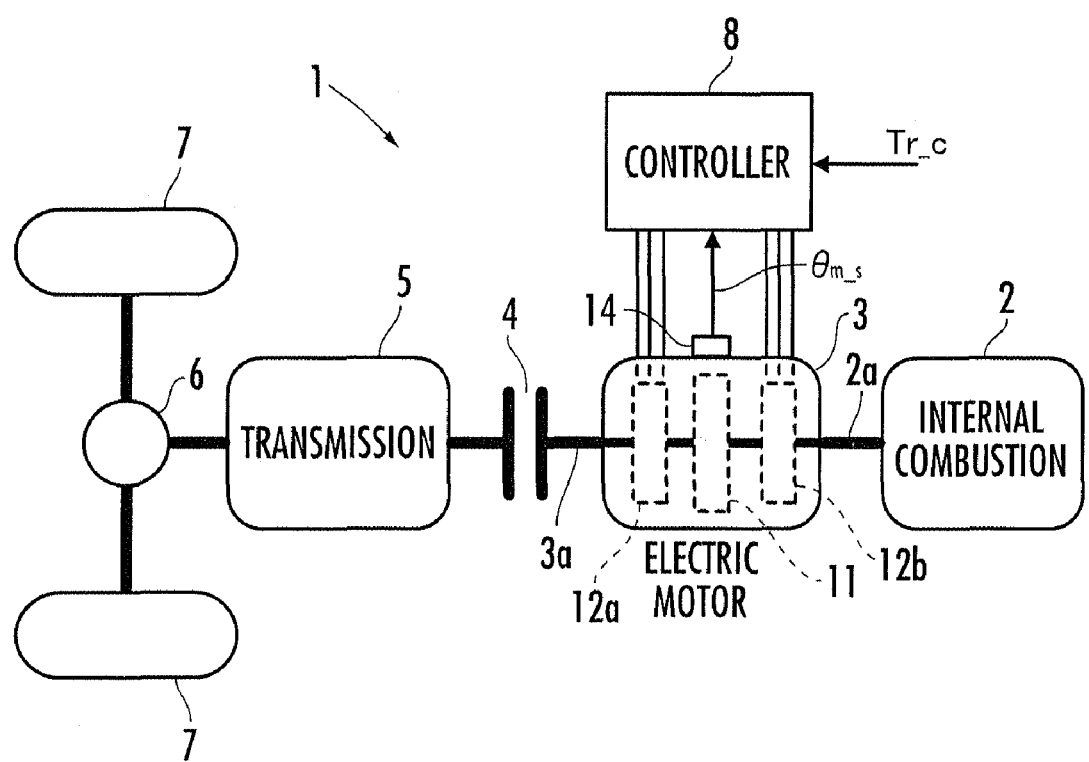
FIG. 1 is a constructional view of a vehicle to which a controller of an electric motor of the present invention is mounted.

First, the schematic construction of a vehicle mounting an electric motor of this embodiment will be explained with reference to FIG. 1.

The vehicle 1 of this embodiment is a hybrid vehicle of a parallel type, and has an internal combustion engine (engine) 2 as a main propulsive force generating source of the vehicle 1, and also has an electric motor 3 as an auxiliary propulsive force generating source of the vehicle 1. The electric motor 3 is an electric motor of an axial air-gap type having a rotor 11, a first stator 12a and a second stator 12b although the electric motor 3 will be described later. A resolver 14 as a rotation angle detecting means for detecting a rotation angle of the rotor 11 of the electric motor 3 is arranged in the electric motor 3.

An output shaft 2a of the internal combustion engine 2 is coaxially directly connected to a rotating shaft 3a rotatable integrally with the rotor 11 of the electric motor 3. The output shaft 2a of the internal combustion engine 2 and the rotating shaft 3a of the electric motor 3 may be also connected through a power transmitting mechanism such as a speed reducer or the like. The output shaft 2a and the rotating shaft 3a are connected to the input side of a transmission 5 through a clutch 4. An output side of the transmission 5 is connected to drive wheels 7, 7 of the vehicle 1 through a differential gear unit 6.

In this vehicle 1, output torque of the internal combustion engine 2, or torque provided by adding output torque (power torque) of the electric motor 3 to this output torque is transmitted to the drive wheels 7, 7 as propulsive force of the vehicle 1 through the clutch 4, the transmission 5 and the differential gear unit 6. Thus, running of the vehicle 1 is performed. The electric motor 3 can also perform a regenerative operation in which the electric motor 3 generates electricity by kinetic energy of the vehicle 1 transmitted from the drive wheels 7, 7 side to the electric motor 3 and this electric power generation energy is charged to an unillustrated storage battery as an electric source of the electric motor 3. Regenerative torque generated by the electric motor 3 during this regenerative operation functions as braking force of the vehicle 1.

Further, the vehicle 1 has a controller 8 for performing operation control of the electric motor 3. A detection value θm_s of the rotation angle of the rotor 11 is inputted from the above resolver 14 to this controller 8. A torque command value Tr_c as a request value of the output torque of the electric motor 3 is also inputted to the controller 8. The torque command value Tr_c is determined by an unillustrated vehicle operation controller performing centralized operation control of the vehicle 1 in accordance with a manipulation amount of an accelerator pedal of the vehicle 1, a manipulation amount of a brake pedal, a vehicle speed or the like.

The controller 8 controls a conducting electric current of each of armature windings of the stators 12a, 12b so as to generate the output torque of torque command value Tr_c in the electric motor 3.

Figure 2A:
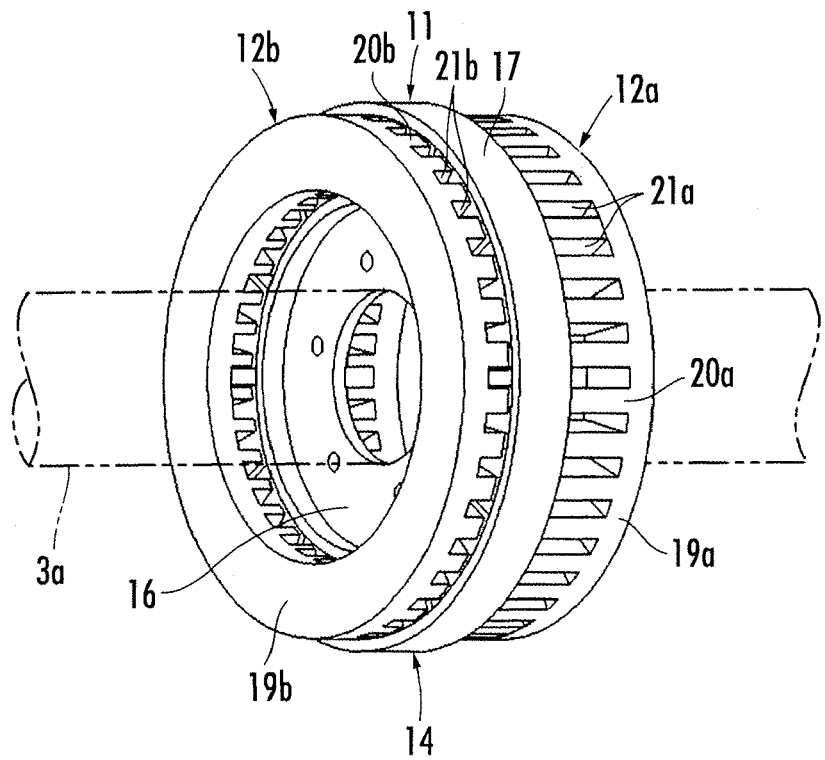
FIG. 2 is an explanatory view of the structure of the electric motor of an axial air-gap type.
Figure 2B:
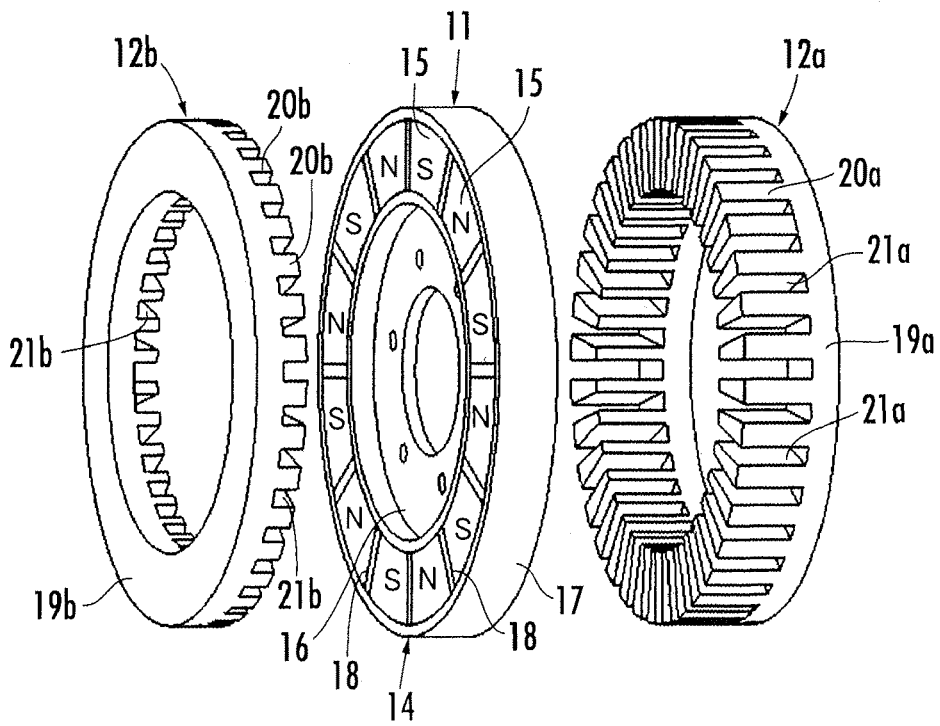
Figure 3:
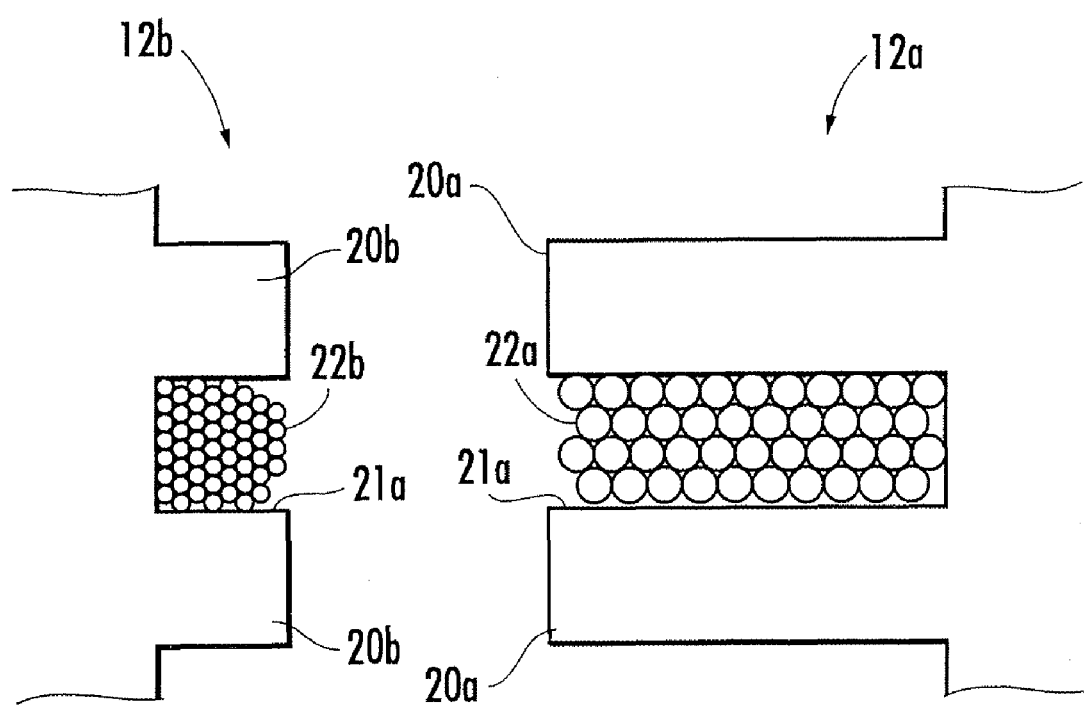
FIG. 3 is an explanatory view of a mounting mode of armatures in a first stator and a second stator.

FIGS. 2(a) and 2(b) are perspective views showing the structure of the rotor 11 of the electric motor 3, the first stator 12a and the second stator 12b. FIG. 2(a) shows the rotor 11, the first stator 12*a* and the second stator 12*b* in an assembled state of the electric motor 3. FIG. 2(*b*) shows the rotor 11, the first stator 12*a* and the second stator 12*b* in a disassembled state of the electric motor 3.

The rotor 11 is constructed from a frame body 14 formed by a non-magnetic material, and a plurality of permanent magnets 15 assembled into this frame body 14. The frame body 14 is constructed by integrally forming a base body 16 of a disk shape, a circular ring-shaped body 17 spaced from an outer circumferential face of this base body 16 in a diametrical direction and coaxially arranged around the base body 16, and a plurality of partition plates 18 connecting these base body 16 and ring-shaped body 17. As shown by a virtual line in FIG. 2(*a*), the rotating shaft 3*a* is coaxially attached to the base body 16.

The plurality of partition plates 18 are radially extended between the outer circumferential face of the base body 16 and an inner circumferential face of the ring-shaped body 17, and are arrayed at an equal angle interval around the axis of the rotor 11. In each space surrounded by the outer circumferential face of the base body 16, the inner circumferential face of the ring-shaped body 17, and the partition plates 18, 18 adjacent to each other in the circumferential direction of the rotor 11, the permanent magnet 15 of the same shape as this space (fan plate shape) is fitted. Thus, the plurality of permanent magnets 15 are arrayed at an equal angle interval around the axis of the rotor 11 between the base body 16 and the ring-shaped body 17.

Each permanent magnet 15 is a magnet in which one face in its thickness direction (the axial direction of the rotor 11) is the north pole and the other face is the south pole. As described in each permanent magnet 15 of FIG. 2(*b*), the permanent magnets 15, 15 adjacent to each other in the circumferential direction of the rotor 11 are set such that their magnetic poles of faces of the same side in the thickness direction are different from each other. In other words, the plurality of permanent magnets 15 arranged in the rotor 11 are arrayed such that the orientations (orientations in the axial direction of the rotor 11) of magnetic fluxes of the permanent magnets 15, 15 adjacent in the circumferential direction of the rotor 11 are mutually reverse. In the illustrated example, the number of permanent magnets 15 is 12, and a number of pole-pairs of the rotor 11 is 6.

Additionally, the permanent magnets may be also arrayed respectively separately on one face side and the other face side of the axial direction of the rotor 11.

The first stator 12*a* and the second stator 12*b* have the same construction except that the first stator 12*a* and the second stator 12*b* are different in thickness. As shown in FIG. 2(*b*), a plurality of teeth 20*a*, 20*b* respectively projected in the axial direction of ring-shaped base bodies 19*a*, 19*b* from one face among both end faces in the axial direction of the base bodies 19*a*, 19*b* are arrayed at an equal angle interval around the axis of the base bodies 19*a*, 19*b*. The base bodies 19*a*, 19*b* and the teeth 20*a*, 20*b* are integrally formed by a magnetic material. In the illustrated example, the numbers of teeth 20*a*, 20*b* of the first stator 12*a* and the second stator 12*b* are respectively 36.

In the first stator 12*a* and the second stator 12*b*, as shown in FIGS. 2(*b*) and 3, an armature winding 22*a* is mounted to a slot 21*a* as a groove between the teeth 20*a*, 20*a* adjacent to each other in the circumferential direction, and an armature winding 22*b* is mounted to a slot 21*b* as a groove between the teeth 20*b*, 20*b*.

In this embodiment, the armature winding 22*a* mounted to the first stator 12*a* and the armature winding 22*b* mounted to the second stator 12*b* have three phases (U-phase, V-phase and W-phase). Further, the armature winding 22*a* in the first stator 12*a* and the armature winding 22*b* in the second stator 12*b* are mutually mounted in the same manner.

For example, when the armature winding 22*a* of each phase of the first stator 12*a* is seen in the axial direction of the first stator 12*a*, this armature winding 22*a* is mounted to the first stator 12*a* such that a winding loop in number equal to the number of permanent magnets 15 of the rotor 11 is formed at an equal angle interval in the circumferential direction of the first stator 12*a*. The armature winding 22*b* of the second stator 12*b* side is also similarly mounted.

Further, a winding pattern of the armature winding 22*a* of the first stator 12*a* side and a winding pattern of the armature winding 22*b* of the second stator 12*b* side are the same, and are set to the same turn number. A wire diameter of the armature winding 22*a* of the first stator 12*a* is larger than that of the armature winding 22*b* of the second stator 12*b* so that the thickness of the second stator 12*b* is thinner than that of the first stator 12*a*.

As shown in FIG. 2(*a*), the first stator 12*a* and the second stator 12*b* are arranged coaxially with the rotor 11 on both sides of the axial direction of the rotor 11 in an assembled state of the electric motor 3 so as to sandwich the rotor 11 between the first stator 12*a* and the second stator 12*b*, and are fixed to an unillustrated housing of the electric motor 3. In this case, tip faces of the tooth 20*a* of the first stator 12*a* and the tooth 20*b* of the second stator 12*b* are opposed in proximity to the rotor 11.

Further, in this embodiment, the first stator 12*a* and the second stator 12*b* are assembled into the electric motor 3 such that the position (an angular position around the axis) of each tooth 20*a* of the first stator 12*a* and the position (an angular position around the axis) of each tooth 20*b* of the second stator 12*b* are conformed when the electric motor 3 is seen in the axial direction of the rotor 11 in the assembled state of the electric motor 3.

Namely, the individual tooth 20*a* of the first stator 12*a* and the individual tooth 20*b* of the second stator 12*b* are arranged in direct opposing positions and are assembled in the axial direction of the rotor 11. The armature winding 22*a* of each phase of the first stator 12*a* and the armature winding 22*b* of the second stator 12*b* of the same phase as this armature winding 22*a* are mounted to the first stator 12*a* and the second stator 12*b* such that the winding loop of the armature winding 22*a* of the first stator 12*a* and the winding loop of the armature winding 22*b* of the second stator 12*b* are opposed to each other in the axial direction of the rotor 11 for each phase (such that the winding loop of the first stator 12*a* side and the winding loop of the second stator 12*b* side are mutually located in the same angular position when these armature windings are seen in the axial direction of the rotor 11).

Accordingly, when the electric current of the same phase is conducted to the armature winding 22*a* of each phase of the first stator 12*a* and the armature winding 22*b* of the second stator 12*b* of the same phase as this armature winding 22*a*, a magnetic flux generated by the armature winding 22*a* of the first stator 12*a* and a magnetic flux generated by the armature winding 22*b* of the second stator 12*b* attain a state mutually strengthened to its maximum extent in the axial direction of the rotor 11 for each phase. In this embodiment, the first stator 12*a* and the second stator 12*b* have the same structure except that the first stator 12*a* and the second stator 12*b* are different in thickness. Accordingly, magnetic circuit cross sections (cross sections of magnetic paths) for each phase of the first stator 12*a* and the second stator 12*b* are mutually the same.

Figure 4:
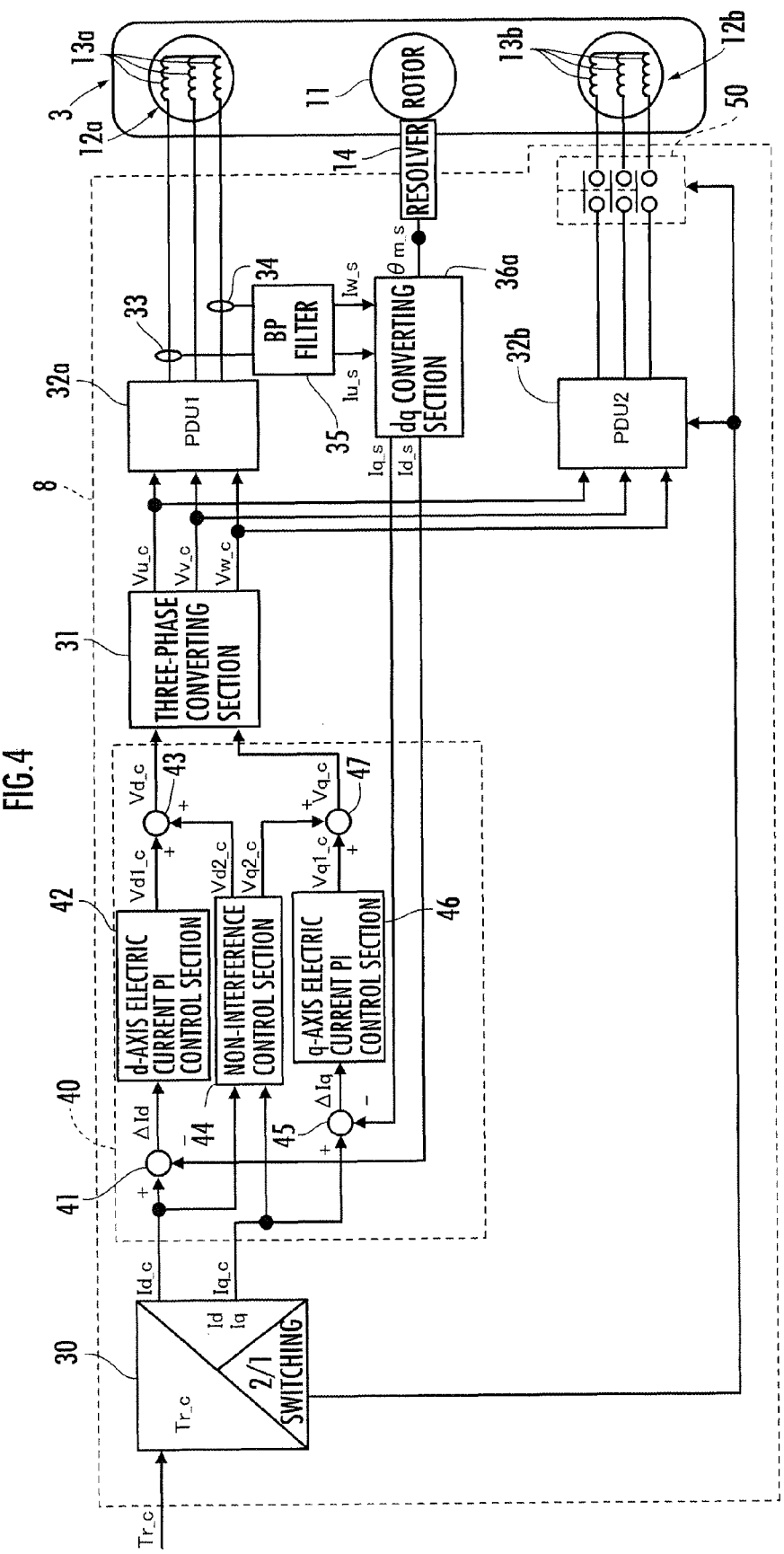
FIG. 4 is a block diagram showing a functional construction of the controller of the electric motor.

Next, the construction of the controller 8 will be explained in detail with reference to FIG. 4. FIG. 4 is a block diagram showing the functional construction of the controller 8. The controller 8 is constructed by an electronic circuit unit including a microcomputer and the like. In the following explanation, as shown in FIG. 4, reference numeral 13a is given to the armature winding of each phase mounted to the first stator 12a, and reference numeral 13b is given to the armature winding of each phase mounted to the second stator 12b.

First, the summary of control processing of the electric motor 3 using the controller 8 will be explained. In this embodiment, conducting electric currents (phase electric currents) of the armature windings 13a, 13b of each phase of the first stator 12a and the second stator 12b of the electric motor 3 are controlled by so-called d-q vector control. Namely, the controller 8 converts the armature windings 13a, 13a, 13a of the three phases of the first stator 12a, and the armature windings 13b, 13b, 13b of the three phases of the second stator 12b into equivalent circuits in a d-q coordinate system of a two-phase direct current, and treats these armature windings.

The equivalent circuits corresponding to the first stator 12a and the second stator 12b respectively have an armature on a d-axis (hereinafter called a d-axis armature), and an armature on a q-axis (hereinafter called a q-axis armature). The d-q coordinate system is a rotating coordinate system in which a field magnet direction provided by the permanent magnet 15 of the rotor 11 is the d-axis, and a direction perpendicular to the d-axis is the q-axis and this rotating coordinate system is rotated integrally with the rotor 11 of the electric motor 3.

The controller 8 then controls the respective phase electric currents of the armature windings 13a, 13b of the first stator 12a and the second stator 12b of the electric motor 3 such that the torque of torque command value Tr_c given from the exterior is outputted from the rotating shaft 3a of the electric motor 3.

In this case, in this embodiment, control for switching between a "both-side stator driving mode" and a "one-side stator driving mode" are switched in accordance with the magnitude of torque command value Tr_c. In the "both-side stator driving mode", a driving electric current is conducted to both the armature winding 13a of the first stator 12a and the armature winding 13b of the second stator 12b, and the electric motor 3 is driven. In the "one-side stator driving mode", the driving electric current is conducted to only the armature winding 13a of the first stator 12a (the supply of the driving electric current to the armature winding 13b of the second stator 12b is stopped), and the electric motor 3 is driven.

The controller 8 has an electric current command determining section 30 (including the function of a driving mode switching means of the present invention) as its functional construction. The electric current command determining section 30 determines a d-axis electric current command value Id_c as a command value of the electric current (hereinafter called a d-axis electric current) of the d-axis armature of the first stator 12a and the second stator 12b, and a q-axis electric current command value Iq_c as a command value of the electric current (hereinafter called a q-axis electric current) of the q-axis armature, and switches between the "both-side stator driving mode" and the "one-side stator driving mode".

Further, the controller 8 has an electric current control section 40 for determining a d-axis voltage command value Vd_c as a command value of the voltage (hereinafter called a d-axis voltage) of the d-axis armature, and a q-axis voltage command value Vq_c as a command value of the voltage (hereinafter called a q-axis voltage) of the q-axis armature, in accordance with d-axis electric current command value Id_c and q-axis electric current command value Iq_c. In this embodiment, d-axis electric current command value Id_c and q-axis electric current command value Iq_c are common with respect to the first stator 12a and the second stator 12b.

Further, the controller 8 has electric current sensors 33, 34 as an electric current detecting means for detecting the respective phase electric currents of the armatures 13a, 13a of two phases, e.g., the U-phase and the W-phase, of the armatures 13a, 13a, 13a of the three phases of the first stator 12a.

Further, the controller 8 has a dq converting section 36 for calculating a d-axis electric current detection value Id_s as a detection value (estimated value) of the d-axis electric current of the first stator 12a and a q-axis electric current detection value Iq_s as a detection value (estimated value) of the q-axis electric current from an electric current detection value Iu_s of the U-phase armature 13a of the first stator 12a and an electric current detection value Iw_s of the W-phase armature 13a obtained by passing the outputs of these electric current sensors 33, 34 through a BP filter 35. The BP filter 35 is a filter of bandpass characteristics for removing a noise component from the outputs of the electric current sensors 33, 34.

The dq converting section 36 calculates the d-axis electric current detection value Id_s and the q-axis electric current detection value Iq_s by coordinate-transforming the electric current detection value Iu_s of the U-phase armature 13a of the first stator 12a, the electric current detection value Iw_s of the W-phase armature 13a, and an electric current detection value Iv_s (=−Iu_s−Iw_s) of the V-phase armature 13a calculated from these electric current detection value Iu_s and electric current detection value Iw_s by the following expression (1) in accordance with an electric angle θe of the rotor 11 (calculated by multiplying a detection value θm_s of the rotation angle of the rotor 11 using the resolver 14 by the number of pole-pairs of the rotor 11).

[Numerical Expression 1]

$$\begin{bmatrix} \text{Id\_s} \\ \text{Iq\_s} \end{bmatrix} = \sqrt{\frac{2}{3}} \cdot A(\theta e) \cdot \begin{bmatrix} \text{Iu\_s} \\ \text{Iv\_s} \\ \text{Iw\_s} \end{bmatrix} \quad (1)$$

Here, $$A(\theta e) = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix}$$

The electric current control section 40 has a subtracting section 41 for calculating an error ΔId (=Id_c−Id_s) between the d-axis electric current command value Id_c and the d-axis electric current detection value Id_s. The electric current control section 40 also has a d-axis electric current PI control section 42 for calculating a basic command value Vd1_c of the d-axis voltage by feedback control using a PI (proportion-integration) control law so as to dissolve the error ΔId (bring the error ΔId_close to zero). The electric current control section 40 also has a subtracting section 45 for calculating an error ΔIq (=Iq_c−Iq_s) between the q-axis electric current command value Iq_c and the q-axis electric current detection value Iq_s. The electric current control section 40 also has a q-axis electric current PI control section 46 for calculating a basic command value Vq1_c of the q-axis voltage by the feedback control using the PI (proportion-integration) control law so as to dissolve the error ΔIq (bring the error ΔIq_close to zero). The electric current control section 40 further has a non-interference control section 44 for calculating a correction amount Vd2_c of the d-axis voltage and a correction amount Vq2_c of the q-axis voltage for canceling speed electromotive forces interfering with each other between the d-axis and the q-axis.

The non-interference control section 44 calculates the correction amount Vd2_c of the d-axis side from the q-axis electric current command value Iq_c and a rotor angular velocity (calculated by differentiating the detection value θm_s of the rotor angle), and calculates the correction amount Vq2_c of the q-axis side from the d-axis electric current command value Id_c and the rotor angular velocity.

Further, the electric current control section 40 has an adding section 43 for adding the correction amount Vd2_c to the basic command value Vd1_c of the d-axis voltage and calculating the final d-axis voltage command value Vd_c, and an adding section 47 for adding the correction amount Vq2_c to the basic command value Vq1_c of the q-axis voltage and calculating the final q-axis voltage command value Vq_c.

Further, the controller 8 has a three-phase converting section 31 for calculating phase voltage command values Vu_c, Vv_c, Vw_c of the armature 13a of the respective U-phase, V-phase and W-phase of the first stator 12a from the d-axis voltage command value Vd_c and the q-axis voltage command value Vq_c. The controller 8 also has a first PDU (Power Drive Unit) 32a for conducting an electric current to the armature 13a of each phase of the first stator 12a in accordance with these phase voltage command values Vu_c, Vv_c, Vw_c. The controller 8 also has a second PDU 32b for conducting an electric current to the armature 13b of each phase of the second stator 12b in accordance with these phase voltage command values Vu_c, Vv_c, Vw_c. The controller 8 further has a change-over switch 50 for switching the electric conduction and interruption between the second PDU 32b and the armatures 13b, 13b, 13b of the respective phases of the second stator 12b.

The three-phase converting section 31 calculates the above phase voltage command values Vu_c, Vv_c, Vw_c by coordinate-transforming the d-axis voltage command value Vd_c and the q-axis voltage command value Vq_c by the following expression (2) in accordance with the electric angle θe of the rotor 11. $A(\theta e)^T$ within expression (2) is a transposition matrix of matrix A(θe) defined in the provision of the above expression (1).

[Numerical Expression 2]

$$\begin{bmatrix} Vu\_c \\ Vv\_c \\ Vw\_c \end{bmatrix} = \sqrt{\frac{2}{3}} \cdot A(\theta e)^T \cdot \begin{bmatrix} Vd\_c \\ Vq\_c \end{bmatrix} \quad (2)$$

Figure 5:
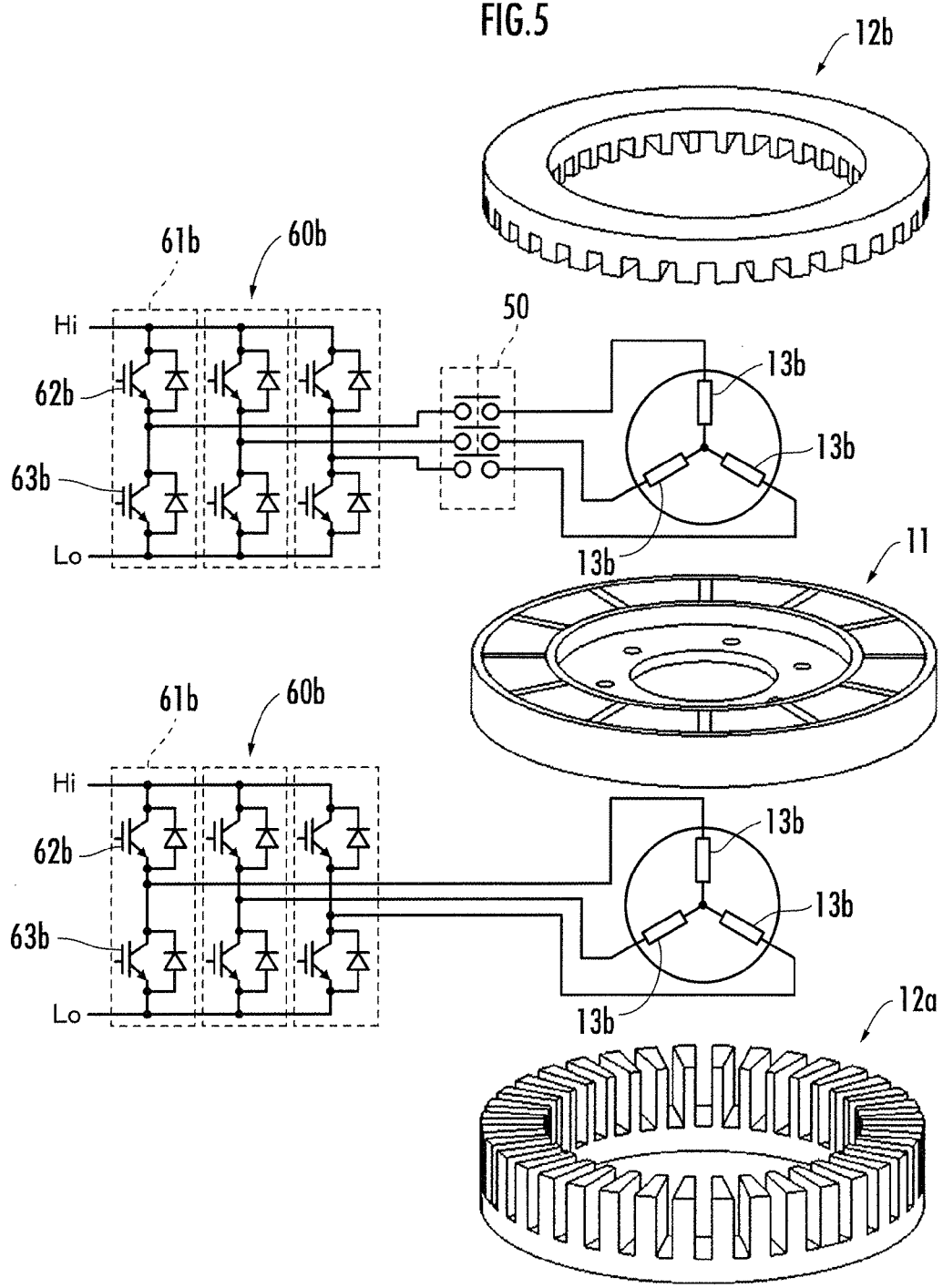
FIG. 5 is a constructional view of a driving circuit of the electric motor.

Here, as shown in FIG. 5, the first PDU 32a has an inverter 60a having a switching circuit 61a for each phase. The switching circuit 61a has a transistor 62a for conducting/interrupting an input section of the armature 13a of each phase of the first stator 12a on a high electric potential side (a side shown by Hi within this figure), and a transistor 63a for conducting/interrupting this input section on a low electric potential side (Lo within this figure). The first PDU 32a changes an electric current conducting amount of each armature winding 13a by switching on/off of the transistor 62a and the transistor 63a of each switching circuit 61a by PWM control.

Similarly, the second PDU 32b has an inverter 60b having a switching circuit 61b for each phase. The switching circuit 61b has a transistor 62b (corresponding to a first switching element of the present invention) for conducting/interrupting each armature winding 13b of the second stator 12b on a high electric potential side, and a transistor 63b (corresponding to a second switching element of the present invention) for conducting/interrupting each armature winding 13b of the second stator 12b on a low electric potential side.

Figure 6:
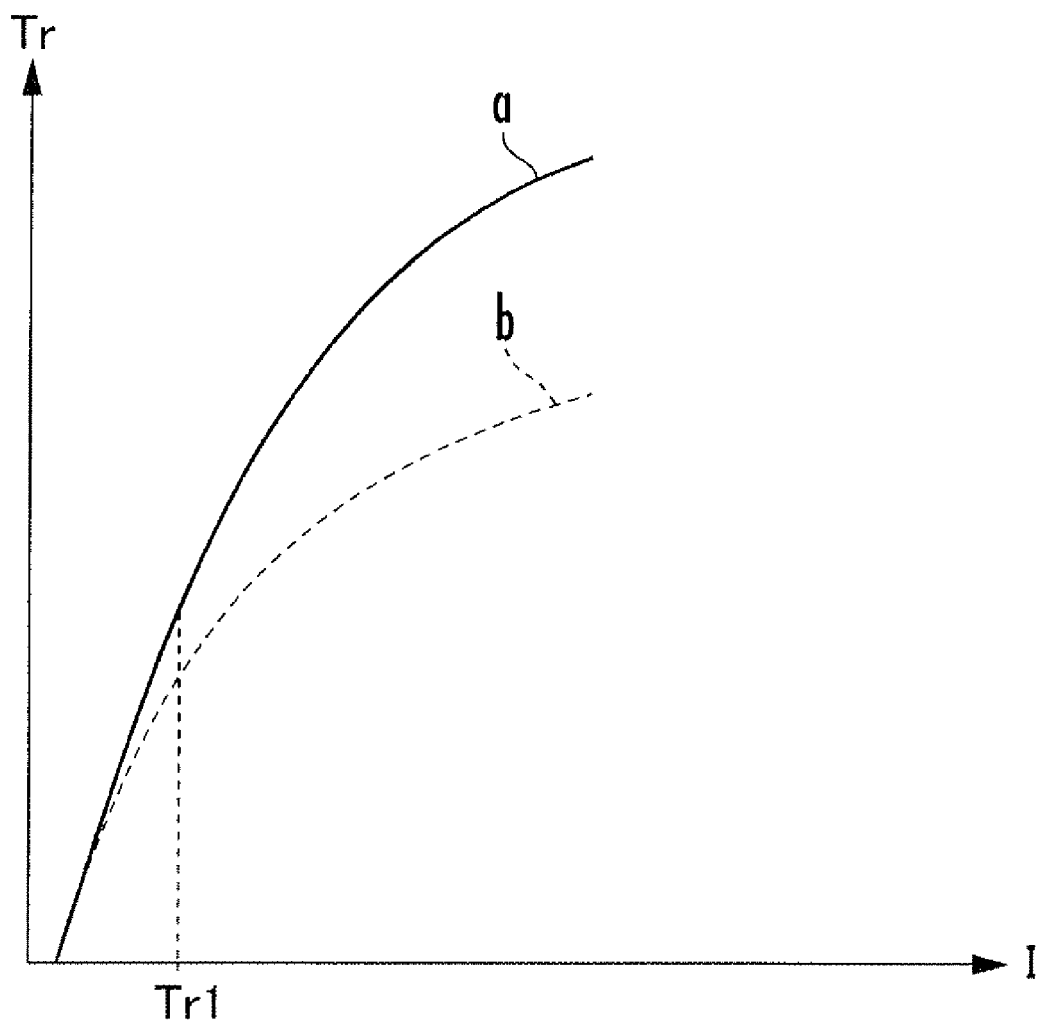
FIG. 6 is an explanatory view of operation states of a both-side stator driving mode and a one-side stator driving mode.

Next, FIG. 6 is a graph showing the relation of output torque Tr and conducting electric current I of the electric motor 3. In this figure, the axis of ordinate is set to output torque Tr, and the axis of abscissa is set to conducting electric current I. Reference numeral a in this figure shows the "both-side stator driving model" for supplying a driving electric current to both the first stator 12a and the second stator 12b, and reference numeral b shows the "one-side stator driving mode" for conducting the driving electric current to only the first stator 12a.

As can be seen from FIG. 6, an upper limit of the output torque of the electric motor 3 can be expanded by setting the "both-side stator driving mode" and changing the output characteristics of the electric motor 3 to a high torque specification. Further, in a low torque area of Tr<Tr1 within this figure, the difference in output torque between the "both-side stator driving mode" and the "one-side stator driving mode" with respect to the same conducting electric current is reduced.

Therefore, output torque Tr is inputted to the electric current command determining section 30, and this electric current command determining section 30 switches between the "both-side stator driving mode" and the "one-side stator driving mode" in accordance with a map (its data are stored to an unillustrated memory of the controller 8 in advance) for outputting switching commands of the d-axis electric current and the q-axis electric current corresponding to output torque Tr and the "both-side stator driving mode" and the "one-side stator driving mode". Specifically, the electric current command determining section 30 sets the "one-side stator driving mode" when torque command value Tr_c is a threshold value Tr1 set in advance or less, and also sets the "both-side stator driving mode" when torque command value Tr_c exceeds the threshold value Tr1.

Thus, in the low torque area, the "one-side stator driving mode" is attained and the output characteristics of the electric motor 3 become a low torque specification. Therefore, it is possible to avoid electric power loss on the second stator 12b side and improve operation efficiency of the electric motor 3.

In the "both-side stator driving mode", the electric current command determining section 30 outputs a mode instruction signal chg_c to the second PDU 32b and the change-over switch 50. Thus, the switch of each phase of the change-over switch 50 is turned on (closing state), and portions between the second PDU 32b and the armature windings 12b, 12b, 12b of the respective phases of the second stator 12b attain an electric conducting state. The second PDU 32b then supplies the driving voltage according to the voltage command values Vu_c, Vv_c, Vw_c to the armature winding 13b of each phase of the second stator 12b through the change-over switch 50.

On the other hand, in the "one-side stator driving mode", the electric current command determining section 30 stops the output of the mode switching signal chg_c. Thus, the switch of each phase of the change-over switch 50 is turned off (opening state), and the portion between the second PDU 32b and the armature winding 13b of each phase of the second stator 12b attains an interrupting state. In this case, no induced voltage is generated in the armature winding 13b of each phase of the second stator 12b even when the rotor 11 is rotated. Therefore, it is possible to avoid that the load of rotation of the rotor 11 is increased by the induced voltage of the second stator 12b side.

In this embodiment, the change-over switch 50 is arranged and the switch of each phase of the change-over switch 50 is turned off and the portion between the second PDU 32b and the armature winding 13b of each phase of the second stator 12b is interrupted in the "one-side stator driving mode". However, all transistors 62b, 63b of the inverter 60b shown in FIG. 6 may be also turned off (gate off). Further, when the rotational speed of the electric motor 3 exceeds a predetermined rotational speed, all transistors 62b of the high electric potential side of the inverter 60b shown in FIG. 6 are turned on and all transistors 63b of the low electric potential side are turned off, or all the transistors 63b of the low electric potential side of the inverter 60b are turned on and all the transistors 62b of the low electric potential side are turned off, so that a three-phase short-circuit state is set. Thus, the current conducting amount of each armature winding 13b of the second stator 12b is reduced and electric power loss can be reduced.

Further, in this embodiment, the winding number of times of the armature winding 13a of the first stator 12a and the winding number of times of the armature winding 13b of the second stator 12b are set to the same so that an induced voltage constant Ke and inductance L of the armature windings 13a, 13b are set to the same. Thus, as shown in FIG. 4, the number of electric current control sections 40 is set to one, and the voltage command values Vu_c, Vv_c, Vw_c with respect to the first PDU 32a and the second PDU 32b are commonly set. However, the electric current control section for the armature winding 13a of the first stator 12a and the electric current control section for the armature winding 13b of the second stator 12b may be also constructed so as to be separately arranged by using different induced voltage constant Ke and inductance L in the armature winding 13a of the first stator 12a and the armature winding 13b of the second stator 12b.

What is claimed is:

1. A controller of an electric motor of an axial air-gap type comprising a rotor having a permanent magnet, and a first stator and a second stator oppositely arranged through the rotor in a rotation axis direction of the rotor;
   wherein the controller comprises a driving mode switching means for switching between a both-side stator driving mode for supplying a driving electric current to both an armature winding of the first stator and an armature winding of the second stator, and a one-side stator driving mode for supplying the driving electric current to only the armature winding of the first stator, in accordance with a request value of output torque of the electric motor
   wherein the controller further comprises a change-over switch for switching connection between the armature winding of the second stator and a driving circuit of the armature winding of the second stator to a conducting state and an interrupting state, and
   wherein the driving mode switching means sets the portion between the armature winding of the second stator and the driving circuit of the armature winding of the second stator to the interrupting state by the change-over switch in the one-side stator driving mode.

2. The controller of the electric motor according to claim 1, wherein the driving mode switching means sets the both-side stator driving mode when the request value of the output torque of the electric motor is a predetermined value or more, and sets the one-side stator driving mode when the request value of the output torque of the electric motor is less than the predetermined value.

3. The controller of the electric motor according to claim 2, wherein a winding number of times of the armature winding of the first stator and a winding number of times of the armature winding of the second stator are set to the same.

4. The controller of the electric motor according to claim 3, wherein a wire diameter of the armature winding of the first stator is set to be larger than a wire diameter of the armature winding of the second stator.

5. A controller of an electric motor of an axial air-gap type comprising a rotor having a permanent magnet, and a first stator and a second stator oppositely arranged through the rotor in a rotation axis direction of the rotor;
   wherein the controller comprises a driving mode switching means for switching between a both-side stator driving mode for supplying a driving electric current to both an armature winding of the first stator and an armature winding of the second stator, and a one-side stator driving mode for supplying the driving electric current to only the armature winding of the first stator, in accordance with a request value of output torque of the electric motor; and
   wherein the driving mode switching means sets both a first switching element for switching conduction and interruption on a high electric potential side of an input section of the armature winding of each phase and a second switching element for switching conduction and interruption on a low electric potential side of the input section of the armature winding of each phase to an off state in the one-side stator driving mode, wherein the first switching element and the second switching element constitute the driving circuit of the second stator and are arranged for each phase of the second stator.

6. The controller of the electric motor according to claim 5, wherein the driving mode switching means sets the both-side stator driving mode when the request value of the output torque of the electric motor is a predetermined value or more, and sets the one-side stator driving mode when the request value of the output torque of the electric motor is less than the predetermined value.

7. The controller of the electric motor according to claim 6, wherein a winding number of times of the armature winding of the first stator and a winding number of times of the armature winding of the second stator are set to the same.

8. The controller of the electric motor according to claim 7, wherein a wire diameter of the armature winding of the first stator is set to be larger than a wire diameter of the armature winding of the second stator.

9. A controller of an electric motor of an axial air-gap type comprising a rotor having a permanent magnet, and a first stator and a second stator oppositely arranged through the rotor in a rotation axis direction of the rotor;
   wherein the controller comprises a driving mode switching means for switching between a both-side stator driving mode for supplying a driving electric current to both an armature winding of the first stator and an armature winding of the second stator, and a one-side stator driving mode for supplying the driving electric current to only the armature winding of the first stator, in accordance with a request value of output torque of the electric motor; and
   wherein the controller further comprises a rotational speed detecting means for detecting a rotational speed of the electric motor;
   the driving mode switching means sets both a first switching element for switching conduction and interruption on a high electric potential side of an input section of the armature winding of each phase and a second switching element for switching conduction and interruption on a low electric potential side of the input section of the armature winding of each phase to an off state in the one-side stator driving mode when the rotational speed of the electric motor is less than a predetermined rotational speed, wherein the first switching element and the second switching element constitute the driving circuit of the second stator and are arranged for each phase of the second stator; and when the rotational speed of the electric motor is the predetermined rotational speed or more in the one-side stator driving mode, each first switching element is set to the on state and each second switching element is set to the off state, or each first switching element is set to the off state and each second switching element is set to the on state.

10. The controller of the electric motor according to claim 9, wherein the driving mode switching means sets the both-side stator driving mode when the request value of the output torque of the electric motor is a predetermined value or more, and sets the one-side stator driving mode when the request value of the output torque of the electric motor is less than the predetermined value.

11. The controller of the electric motor according to claim 10, wherein a winding number of times of the armature winding of the first stator and a winding number of times of the armature winding of the second stator are set to the same.

12. The controller of the electric motor according to claim 11, wherein a wire diameter of the armature winding of the first stator is set to be larger than a wire diameter of the armature winding of the second stator.

* * * * *